United States Patent
Hobmeyr et al.

(10) Patent No.: US 8,927,171 B2
(45) Date of Patent: Jan. 6, 2015

(54) METHOD FOR PREVENTING PRESSURE IN VESSELS FROM DROPPING BELOW MINIMUM ALLOWABLE PRESSURE

(75) Inventors: Ralph Hobmeyr, Mainz-Kastel (DE); Heiko Hrobarsch, Wiesbaden (DE); Björn Zörner, Trebur (DE)

(73) Assignee: GM Global Technology Operations LLC, Detroit, MI (US)

( * ) Notice: Subject to any disclaimer, the term of this patent is extended or adjusted under 35 U.S.C. 154(b) by 868 days.

(21) Appl. No.: 12/882,068

(22) Filed: Sep. 14, 2010

(65) Prior Publication Data

US 2012/0060936 A1    Mar. 15, 2012

(51) Int. Cl.
*F17C 13/02* (2006.01)
*H01M 8/04* (2006.01)
*F17C 13/00* (2006.01)

(52) U.S. Cl.
CPC ............... *F17C 13/00* (2013.01); *F17C 13/02* (2013.01); *Y02E 60/321* (2013.01)
USPC ............... 429/444; 429/429; 137/14; 48/191

(58) Field of Classification Search
USPC ............... 429/428–451; 137/14, 487–492.5; 48/179, 191
See application file for complete search history.

(56) References Cited

U.S. PATENT DOCUMENTS

| | | | | |
|---|---|---|---|---|
| 6,302,130 | B1 * | 10/2001 | Ohmi et al. | 137/14 |
| 2002/0017286 | A1 * | 2/2002 | Rice et al. | 124/71 |
| 2003/0049501 | A1 * | 3/2003 | Fujita | 429/20 |

* cited by examiner

*Primary Examiner* — Barbara Gilliam
*Assistant Examiner* — Helen McDermott
(74) *Attorney, Agent, or Firm* — John A. Miller; Miller IP Group, PLC (57) ABSTRACT

A method and system for preventing gas pressure in a pressure vessel from dropping below a minimum allowable pressure. Pressure readings from a pressure sensor downstream of a pressure regulator are monitored by a processor as they vary within a steady fluctuation band under normal regulated pressure conditions. When the pressure regulator reaches a fully open position in low vessel pressure conditions, the processor detects a drop in the pressure reading to a value below the recent fluctuation band, and recognizes that the pressure is dropping below the regulation pressure value. The processor can use this information to shut off flow of gas from the vessel, thus preventing the vessel from dropping below its minimum allowable pressure, regardless of the actual magnitude of the pressure reading from the sensor—which can vary through a wide range due to tolerances.

16 Claims, 5 Drawing Sheets

FIGURE 5

METHOD FOR PREVENTING PRESSURE IN VESSELS FROM DROPPING BELOW MINIMUM ALLOWABLE PRESSURE

BACKGROUND OF THE INVENTION

1. Field of the Invention

This invention relates generally to a method for preventing gas pressure in a pressure vessel from dropping below a minimum allowable pressure and, more particularly, to a method for preventing pressure in one or more pressure vessels in a hydrogen storage system from dropping below a minimum allowable pressure which monitors the normal tolerance-driven fluctuations in pressure readings at a pressure sensor downstream of a pressure regulator and, if a pressure drop in excess of the normal fluctuations is detected, shuts down the hydrogen storage system to prevent the pressure in the vessels from dropping too low.

2. Discussion of the Related Art

Hydrogen is a very attractive fuel because it is clean and can be used to efficiently produce electricity in a fuel cell. The automotive industry expends significant resources in the development of hydrogen fuel cell systems as a source of power for vehicles. Such vehicles would be more efficient and generate fewer emissions than today's vehicles employing internal combustion engines.

Typically hydrogen gas is stored at high pressure in pressure vessels on the vehicle to provide the hydrogen necessary for the fuel cell system. The pressure in the vessels can be 700 bar or more. In one known design, the pressure vessels include an inner plastic liner that provides a gas tight seal for the hydrogen gas, and an outer carbon fiber composite layer that provides the structural integrity of the vessel. A hydrogen storage system typically includes at least one pressure regulator that reduces the pressure of the hydrogen gas from the high pressure of the vessels to a pressure suitable for the fuel cell system.

If the pressure within the vessels falls below a certain value, and the vessels are then refilled at a high rate of pressure increase, the inner liner layer may begin to separate from the outer structural layer. This separation could cause inner liner damage and loss of leak-tightness, and thus must be avoided. A current solution to avoid this separation is to maintain a high enough pressure within the vessels to prevent inner liner layer separation. For one exemplary vessel design, a minimum pressure of 20 bar must be maintained in the vessels to prevent the inner liner layer from separating from the outer structural layer.

One or more pressure sensors provide a measurement of the hydrogen gas pressure within the vessels and elsewhere in the hydrogen storage system. Because the pressure sensors employed in these types of systems need to provide a pressure measurement over a range of nearly 1000 bar, and they need to be relatively inexpensive, they typically have a tolerance band of about 1.5%, which gives an accuracy of +/−15 bar. Further, considering the measurement requirements of the sensor wiring over the entire temperature range that the vessels may encounter typically provides a measurement accuracy of +/−35 bar, which is added to the 20 bar minimum allowable pressure to provide the desired safety margin. Thus, in typical system designs, hydrogen discharge from the vessels needs to be stopped at a vessel pressure sensor reading of about 55 bar, resulting in about 5% of the hydrogen gas within the vessels not being usable for vehicle operation.

A method is needed for reliably protecting the pressure vessels from dropping below the minimum allowable pressure, but still allowing the most possible hydrogen gas to be consumed by the fuel cell. Such a method would allow the vehicle to be driven a greater distance between refueling events, thus improving customer satisfaction, while still protecting the vessels from dropping below the minimum allowable pressure.

SUMMARY OF THE INVENTION

In accordance with the teachings of the present invention, a method and system are disclosed for preventing gas pressure in a pressure vessel from dropping below a minimum allowable pressure. Pressure readings from a pressure sensor downstream of a pressure regulator are monitored by a processor as they vary within a steady fluctuation band under normal regulated pressure conditions. When the pressure regulator reaches a fully open position in low vessel pressure conditions, the processor detects a drop in the pressure reading to a value below the recent fluctuation band, and recognizes that the pressure is dropping below the regulation pressure value. The processor can use this information to shut off flow of gas from the vessel, thus preventing the vessel from dropping below its minimum allowable pressure, regardless of the actual magnitude of the pressure reading from the sensor—which can vary through a wide range due to tolerances.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method and system for preventing a pressure vessel from dropping below a minimum allowable pressure is merely exemplary in nature, and is in no way intended to limit the invention or its applications or uses. For example, the disclosed methods and systems have particular application to a hydrogen storage system for a fuel cell vehicle, but may also be applicable to any gas storage or gas handling system.

Figure 1:
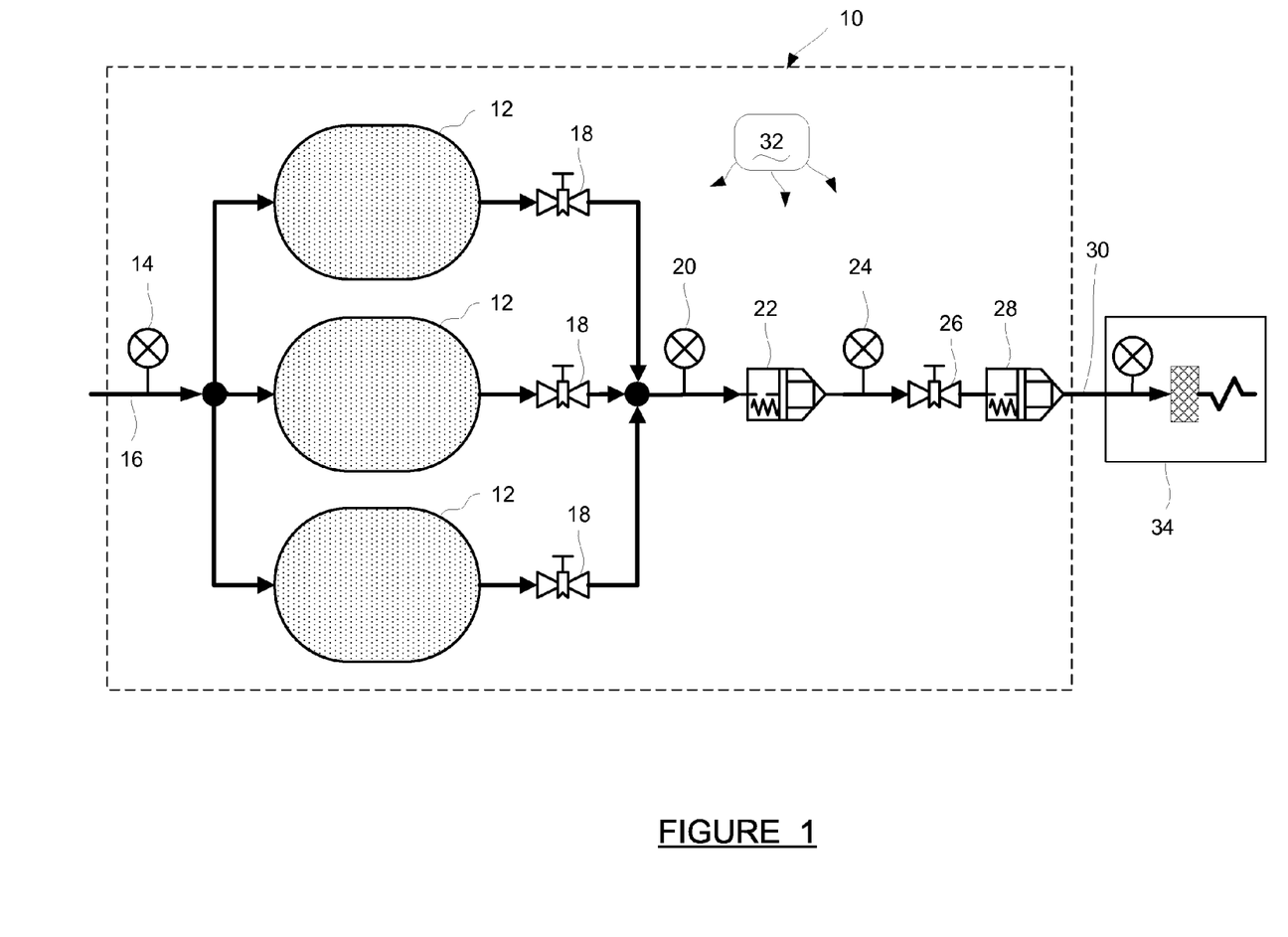
FIG. 1 is a schematic diagram of a hydrogen storage system for a fuel cell.

FIG. 1 is a schematic diagram of a hydrogen storage system 10 for a fuel cell 34. Pressure vessels 12 store hydrogen gas at a high pressure. More or fewer of the pressure vessels 12 could be used than the three shown in the hydrogen storage system 10. A pressure sensor 14 measures the pressure at a filler line 16 which is used to fill the vessels 12 from an external supply (not shown). Shut-off valves 18 are situated just downstream from each of the pressure vessels 12. The terms upstream and downstream are used throughout this disclosure with respect to the direction of hydrogen gas flow, with the fuel cell 34 being downstream of the pressure vessels 12. A pressure sensor 20 measures the hydrogen pressure between the shut-off valves 18 and a pressure regulator 22. The pressure regulator 22 is used to reduce the pressure of the hydrogen gas from the high pressure of the vessels 12 down to a lower pressure which is near that required by the fuel cell 34.

A pressure sensor 24 measures the hydrogen pressure downstream of the regulator 22 and upstream of a shut-off valve 26. The shut-off valve 26 can be closed to completely isolate the hydrogen storage system 10 from the fuel cell 34. A second pressure regulator 28 is used to reduce the hydrogen gas pressure down to the low pressure required by the fuel cell 34, which may be around 6 bar. Fuel supply line 30 connects the hydrogen storage system 10 to the fuel cell 34. A controller 32—in communication with the valves 18, the sensors 14, 20, and 24, the regulators 22 and 28, the valve 26, and the fuel cell 34—can be used to monitor conditions in the hydrogen storage system 10 and the fuel cell 34, and control the shutdown of the hydrogen storage system 10 if necessary to prevent the hydrogen gas pressure in the vessels 12 from dropping too low. For simplicity, the details of the fuel cell 34 are omitted, as are various filters, check valves, relief valves, and other components of the hydrogen storage system 10.

The pressure of the hydrogen gas contained in the pressure vessels 12 can be as much as 700 bar or even higher. As a result, a high-range pressure transducer or sensor, typically with a range of about 900 bar, must be used for at least the pressure sensors 14 and 20. The same type of sensor may also be used for the pressure sensor 24. High-range sensors inherently have a high tolerance band around the pressure readings, which can significantly affect the accuracy of readings throughout their range. A typical pressure transducer or pressure sensor, such as the pressure sensor 14 which measures the pressure of the hydrogen gas in the vessels 12, consists of a membrane and possibly several electronic components configured such that an output voltage signal is produced which is proportional to the pressure differential being experienced by the membrane. Each of the components of the sensor 14 has a base tolerance which can be represented as a plus or minus pressure variance. In addition, each of the components also experiences long-term drift, which further impacts the accuracy of the sensor 14. When all of the tolerances of the components are added up, a typical high-range pressure transducer or sensor, such as the pressure sensor 14, can have a pressure reading tolerance of +/−35 bar or higher.

Figure 2:
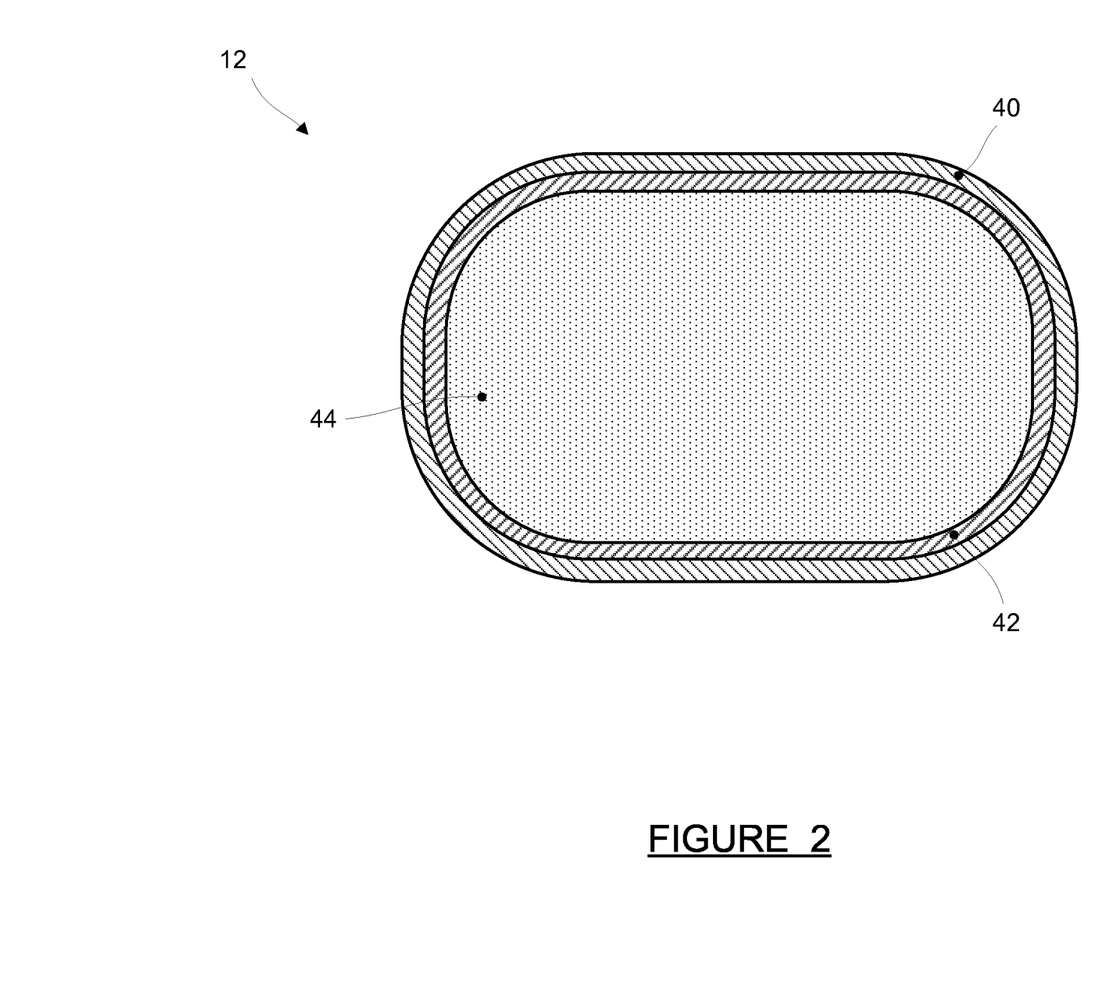
FIG. 2 is a cross-sectional view of a pressure vessel used for hydrogen gas storage in the hydrogen storage system of FIG. 1.

FIG. 2 is a cross-sectional view of one of the pressure vessels 12 from the hydrogen storage system 10. The vessel 12 includes an outer structural layer 40, typically made of a carbon fiber composite material to provide structural integrity, and an inner liner 42, typically made of a durable molded plastic, such as a high density polyethylene. An interior volume 44 contains the hydrogen gas. The liner 42 provides an impervious surface for containment of the hydrogen gas, and the outer layer 40 provides the structural integrity for the high pressures of the compressed hydrogen gas. The vessel 12 includes an adaptor (not shown) in an opening extending through the outer structural layer 40 and the inner liner 42 that provides access to the interior volume 44 for filling the vessel 12 and removing gas from the vessel 12 in a manner that is well understood to those skilled in the art.

The design of the pressure vessel 12 described above has proven to be reliable and cost effective. However, experience has shown that if the vessel 12 is initially pressurized with hydrogen gas, then the gas pressure is subsequently allowed to drop to a very low value, followed by a rapid re-pressurization, delamination of the inner liner 42 from the outer structural layer 40 can occur. In order to prevent this delamination, the hydrogen storage system 10 must be designed to prevent the pressure of the hydrogen gas in the interior volume 44 from dropping below a minimum allowable pressure value, typically about 20 bar in a common vessel design.

The high tolerance band on the pressure readings at the pressure sensor 14, described above, makes it difficult to accurately determine how much hydrogen actually remains in the vessels 12. This creates a problem when the pressure is nearing the minimum allowable pressure, as the hydrogen storage system 10 may need to be shut down prematurely in order to protect the vessels 12. For example, the vessels 12 may have a minimum allowable pressure of 20 bar. If the pressure sensor 14 has a tolerance of +/−35 bar, then the minimum allowable pressure of 20 bar could possibly be reached when the pressure sensor 14 reads 55 bar (20 bar actual pressure plus 35 bar tolerance). Therefore, with a +/−35 bar tolerance around readings at the sensor 14, the hydrogen storage system 10 would have to be designed to shut down when the pressure reading at the sensor 14 reaches 55 bar in order to protect the vessels 12. However, due to the uncertainty of the pressure reading at the sensor 14, the actual pressure remaining in the vessels 12 may be as high as 90 bar (the 55 bar reading plus the 35 bar tolerance) in such a situation. The result of all of this is that the hydrogen storage system 10 and the fuel cell 34 will have to be designed to shut down when, in most cases, a significant usable amount of hydrogen still remains in the vessels 12.

It is possible to monitor other data in the hydrogen storage system 10, besides the high-tolerance band pressure reading at the sensor 14, to determine when the pressure in the vessels 12 is nearing the minimum allowable pressure. In particular, the pressure at the sensor 24 downstream of the pressure regulator 22 can be monitored to detect a pressure drop, which indicates that the regulator 22 is fully open. In a typical current design of the hydrogen storage system 10, the regulator 22 has a regulation pressure slightly higher than the minimum allowable pressure of the vessels 12. This means that, if the regulator 22 is fully open and the pressure downstream of the regulator 22 is dropping below the regulation pressure, then the pressure in the vessels 12 is getting very close to the minimum allowable pressure and the hydrogen storage system 10 must be shut down soon.

Figure 3:
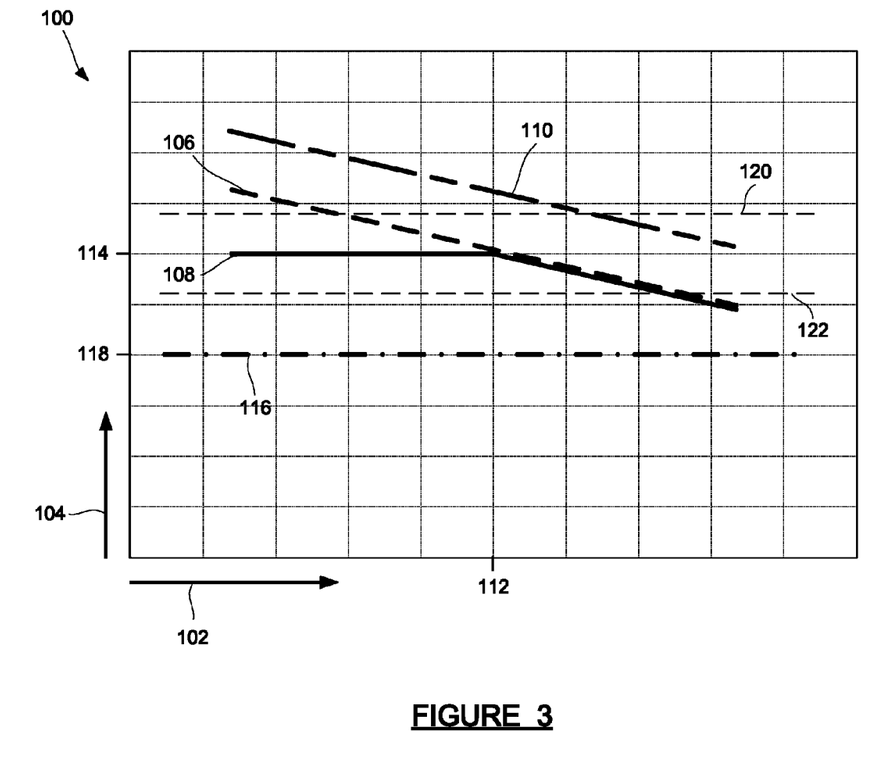
FIG. 3 is a graph of gas pressure at three pressure sensors in the hydrogen storage system of FIG. 1.

FIG. 3 is a graph 100 showing the pressure readings at the pressure sensors 14, 20, and 24 as the pressure in the hydrogen storage system 10 drops and the pressure regulator 22 fully opens. Horizontal axis 102 represents time, while vertical axis 104 represents pressure. Curve 106 is the pressure at the sensor 20, just upstream of the regulator 22. Curve 108 is the pressure at the sensor 24, just downstream of the regulator 22. Curve 110 is the pressure at the sensor 14, upstream of the vessels 12. At the left ends of the curves 106, 108, and 110, it can be seen that the pressure at the sensors 14 and 20 is dropping, while the pressure at the sensor 24 is holding steady at the regulation pressure of the regulator 22. Around the middle of the curves, at the time indicated by time mark 112, the pressure at the sensor 20, shown by the curve 106, reaches the regulation pressure value. From this time onward, the regulator 22 is fully open, and the pressure at the sensors 20 and 24 are essentially the same. Meanwhile, the pressure at the sensor 14 is somewhat higher, due to pressure drops in the hydrogen storage system 10 caused by various check valves, pipes, and other components.

The regulation pressure value, indicated by pressure mark 114, is about 29 bar in a typical implementation. The minimum allowable pressure in the vessels 12 is shown by line 116. As mentioned above, the minimum allowable pressure, indicated by pressure mark 118, is typically about 20 bar. The tolerance bands on the regulation pressure of the regulator 22 are shown by lines 120 and 122. It can be seen by the relationship of the curves on the graph 100 that the full opening of the pressure regulator 22 can be used as an indication that the pressure in the vessels 12 is approaching the minimum allowable pressure, and that the hydrogen storage system 10 needs to be shut down soon to prevent further pressure drop. The mechanical tolerance band on the regulation pressure of the regulator 22 is much tighter than the combined mechanical and electrical tolerances of the sensors 14, 20, and 24—especially when the analog to digital conversion tolerances at the controller 32 are taken into account. Therefore, it is possible to design a system shutdown strategy based on the regulation pressure of the regulator 22 which is essentially immune to the large tolerances of the pressure readings at the sensors 14, 20, and 24.

Figure 4:
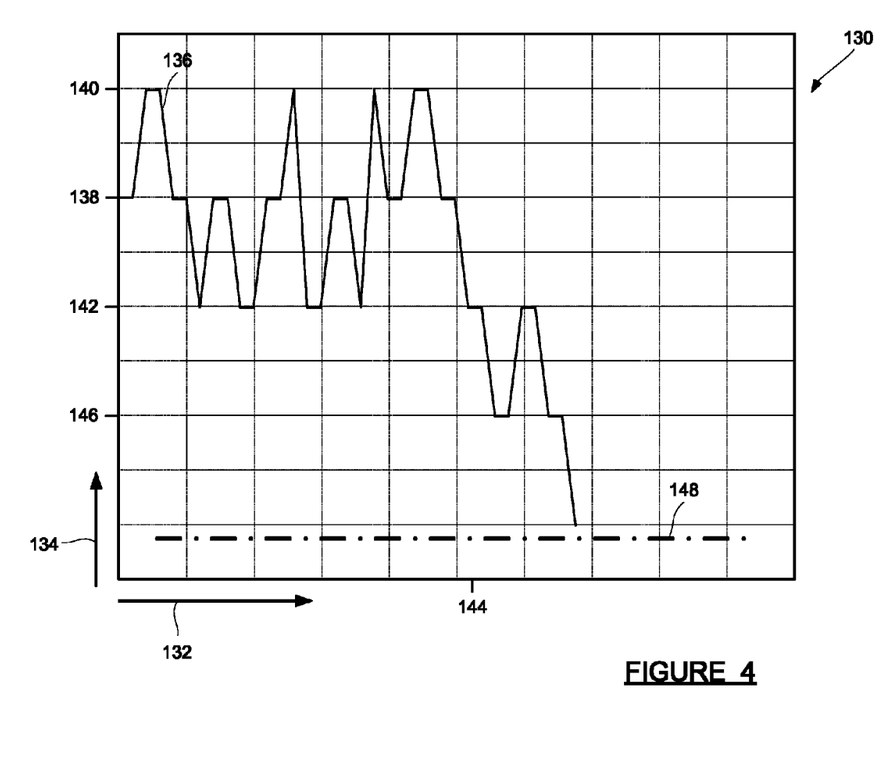
FIG. 4 is a graph of pressure data from a pressure sensor as recorded in a system processor.

In order to use the full opening of the regulator 22 as a trigger for shutting down the hydrogen storage system 10 to prevent dropping below the minimum allowable pressure, the inherent behavior of the pressure readings at the sensor 24 must be understood. FIG. 4 is a graph 130 showing the pressure signal from the sensor 24 as stored by the controller 32. Just as with the graph 100 of FIG. 3, horizontal axis 132 represents time, and vertical axis 134 represents pressure. Pressure trace 136 is the pressure reading at the sensor 24 as stored by the controller 32. Thus, the graph 130 is essentially a greatly magnified version of the curve 108 on the graph 100. On the graph 130, the pressure trace 136 shows a fluctuation around a median value designated by the pressure mark 138. This fluctuation is an inherent trait of the pressure readings as stored in the controller 32, and this fact can be used as the basis of the control strategy of the present invention.

The controller 32 must monitor data from many different devices, perform numerous real-time calculations, and run many control algorithms simultaneously. Therefore, it is critical that memory space and computing power be allocated judiciously. In a typical implementation, the pressure readings from the sensors 14, 20, and 24 are stored in registers of only 8 bits in size. This means that the 900 bar range of the sensor 24, for example, must be divided up between $2^8$ (the number 2 raised to the power of 8) or 256 increments. 900 bar divided by 256 increments equals 3.5156 bar per increment, which is the pressure reading resolution in the controller 32. This will be rounded to 3.5 bar/increment in this discussion for brevity. Returning attention to the pressure trace 136 on the graph 130, the fluctuations above and below the median pressure value represent this phenomenon. That is, pressure mark 140 is 3.5 bar higher than the pressure mark 138, and pressure mark 142 is 3.5 bar lower than the pressure mark 138. Because of the tolerances in the sensor 24, including its mechanical tolerances, analog-to-digital and digital-to-analog conversion tolerances, wiring resistance tolerances, and others, the analog voltage signal received by the controller 32 exhibits a slight variation, even when the regulator 22 is not fully open and the pressure at the sensor 24 is essentially constant. The slight variations in signal voltage from the sensor 24 are amplified by the 8-bit storage register resolution of the controller 32, resulting in the real-world behavior shown by the pressure trace 136.

While the fluctuation shown by the pressure trace 136 at first seems troublesome, the very predictable nature of the fluctuation can be used as the basis for a control strategy. It has been observed over years of actual usage of the hydrogen storage system 10 that the pressure trace 136 consistently remains within plus or minus one 3.5-bar increment of the median pressure value, as long as the regulator 22 is not fully open. Only when the regulator 22 reaches a fully open position, and the real pressure at the sensor 24 begins to drop below the regulation pressure, does the pressure trace 136 drop below the pressure shown by the pressure mark 142. On the graph 130, the regulator 22 reaches a fully open position and the pressure at the sensor 24 begins to drop, at the time designated by time mark 144. After that time, it can be seen that the pressure trace 136 drops an additional 3.5 bar increment, down to a pressure designated by pressure mark 146. A few time steps later, after some additional fluctuation, the pressure trace 136 drops to an even lower value. This behavior has been consistently observed in real implementations of the hydrogen storage system 10, and is a reliable indicator that the regulator 22 is fully open and the pressure at the sensor 24 is dropping.

Line 148 on the graph 130 represents the minimum allowable pressure in the vessels 12, which is typically about 20 bar. It is noteworthy that the minimum allowable pressure is sufficiently below the median pressure value, so that the pressure trace 136 can drop at least one 3.5-bar increment below the median value without crossing below the minimum allowable pressure. Also, it was shown on the graph 100 that, when the pressure readings at the sensors 20 and 24 reach the regulation pressure of the regulator 22, the pressure at the sensor 14 is still somewhat higher. Thus, the pressure in the vessels 12 will not drop below the minimum allowable pressure, even if the pressure at the sensors 20 and 24 does drop slightly below the minimum allowable pressure.

Figure 5:
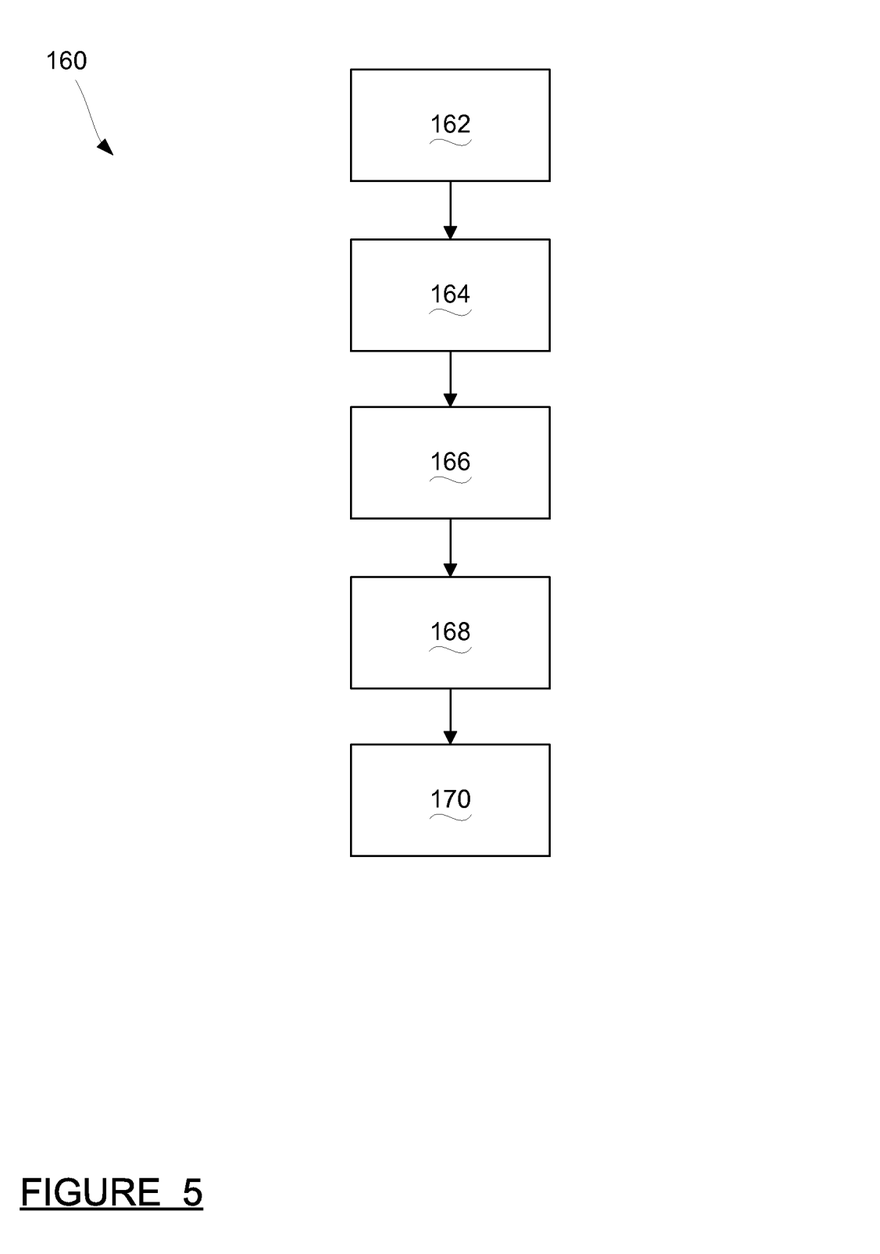
FIG. 5 is a flow chart diagram of a method which can be used to shut down the hydrogen storage system in order to prevent the pressure in the vessels from dropping below a minimum allowable pressure.

Implementing a control strategy based on the phenomenon described above then becomes straightforward. FIG. 5 is a flow chart diagram 160 of a method which can be used to shut down the hydrogen storage system 10 in order to prevent the pressure in the vessels 12 from dropping below the minimum allowable pressure. At box 162, a pressure increment value is defined, based on the range of the sensor 24 and the resolution of the data register in the controller 32. As described in the examples above, a 900 bar pressure range and an 8-bit data register result in a pressure increment of 3.5 bar in the controller 32. Thus, the pressure increment value will be known for any implementation of the sensor 24 and the controller 32. At box 164, the controller 32 monitors the pressure from the sensor 24 and identifies the fluctuation range within which the pressure is varying. At box 166, the controller 32 calculates a rolling median pressure value for a certain time window. In one example, the time window is the past 60 seconds; however, longer or shorter windows could be defined as appropriate. The rolling median pressure value can be calculated by simply selecting the median (middle) value of the three different pressure readings which have most recently been recorded, as described previously and shown on the graph 130. Other methods of calculating the rolling median pressure value could also be used.

With the rolling median pressure value established and the pressure increment value known, at box 168 the controller 32 can detect a pressure reading at the sensor 24 which is below the normal fluctuation range. The detection activity at the box 168 can be accomplished in one of two ways. First, the controller 32 can compare each new pressure reading with the previous reading to determine if the value has dropped by more than two pressure increments. A drop of two increments is possible under normal steady pressure conditions, as shown on the graph 130. But a drop of more than two increments indicates that the pressure at the sensor 24 is actually dropping below the regulation pressure of the regulator 22. Second, the controller 32 can compare each new pressure reading with the rolling median pressure value. If a pressure reading more than one increment below the rolling median pressure is detected, then the pressure at the sensor 24 is actually dropping below the regulation pressure of the regulator 22. The two techniques for detecting a pressure below the normal fluctuation range may also be combined in a way that can accommodate a slight upward or downward drift of the fluctuation range during vehicle operation, without unnecessarily shutting down the hydrogen storage system 10.

In the event that a pressure outside the normal fluctuation range is detected at the box 168, the controller 32 commands a shutdown of the hydrogen storage system 10 at box 170. The shutdown can most effectively be accomplished by closing the shutoff valves 18, which are situated just downstream of the vessels 12. By closing the shutoff valves 18, the hydrogen gas contained in the pipes and components downstream of the valves 18 can be consumed by the fuel cell 34 before the fuel cell 34 stops producing electricity. In addition, the vehicle batteries will have at least a small amount of electrical charge remaining from fuel cell operation. The residual hydrogen gas and the residual electrical energy in the batteries will provide sufficient driving time for the driver to park the vehicle before it completely stops.

The shutdown sequence at the box 170 may also include a small time delay before closing the valves 18. This is based on the fact that the pressure in the vessels 12, represented by the reading of the sensor 14, is known to be higher than the pressure at the regulator 22, due to pressure drops therebetween. This fact can be used to allow a little additional time for the driver to park the vehicle upon being notified that the fuel cell 34 is shutting down imminently, while still preventing the vessels 12 from dropping below the minimum allowable pressure. The amount of time delay can be determined based on the known pressure drop between the sensors 14 and 20, the capacity of the vessels 12 and the lines and fittings, and the rate at which hydrogen gas is being consumed.

It is emphasized that the specific values described above, including the 900 bar range of the sensor 24, the 20 bar minimum allowable pressure, and the 8 bit storage register size, are all just examples. Higher or lower values could be used for any of these, but the operating principle of the detection and control strategy would remain the same.

In actual implementation, a low fuel warning would be issued to the driver of the vehicle well before the system shutdown procedure described above would have to be executed. The low fuel warning would be triggered by a pressure reading at the sensor 14 crossing below some threshold value, such as 80 bar, and most drivers would refuel their vehicle soon thereafter. As such, it is expected that the enforced system shutdown procedure would rarely have to be executed in real world driving situations. Nonetheless, the enforced system shutdown based on a pressure drop at the sensor 24, as disclosed herein, can provide an extra measure of protection for the reliability of the vessels 12. In doing so, it also avoids shutdown of the hydrogen storage system 10 when a significant amount of usable fuel still remains in the vessels 12, thus allowing the greatest possible driving range of the vehicle between refueling stops.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for preventing pressure in one or more pressure vessels in a gas storage system from dropping below a minimum allowable pressure, said method comprising:
    operating the gas storage system to provide a gas to a downstream device via a single flow path;
    defining a pressure reading increment value, including dividing a range of the pressure sensor by a number of possible values of the pressure reading;
    monitoring pressure of the gas at a pressure sensor which is located downstream of a pressure regulator in the single flow path;
    identifying a fluctuation range of preceding pressure readings from the pressure sensor, including calculating a rolling median pressure value for the preceding pressure readings from the pressure sensor;
    determining that a current pressure reading from the pressure sensor is lower than the fluctuation range of the preceding pressure readings; and
    closing vessel shut-off valves located downstream of each of the one or more pressure vessels, to prevent the pressure in the vessels from dropping below the minimum allowable pressure.

2. The method of claim 1 wherein determining that a current pressure reading from the pressure sensor is lower than the fluctuation range of the preceding pressure readings includes determining that the current pressure reading from the pressure sensor is lower than the rolling median pressure value by more than the pressure reading increment value.

3. The method of claim 1 wherein calculating a rolling median pressure value for preceding pressure readings from the pressure sensor includes calculating the rolling median pressure value for a preceding time window of between 30 seconds and five minutes.

4. The method of claim 1 wherein determining that a current pressure reading from the pressure sensor is lower than the fluctuation range of the preceding pressure readings includes determining that the current pressure reading from the pressure sensor is lower than a previous pressure reading from the pressure sensor by more than twice the pressure reading increment value.

5. The method of claim 1 wherein closing vessel shut-off valves includes providing a time delay which begins when it is determined that the current pressure reading from the pressure sensor is lower than the fluctuation range of the preceding pressure readings and ends when closing the vessel shut-off valves is commanded.

6. The method of claim 1 wherein the gas is hydrogen.

7. The method of claim 1 wherein the downstream device is a fuel cell system.

8. The method of claim 7 wherein the fuel cell system is used to power a vehicle.

9. A method for preventing pressure in one or more pressure vessels in a hydrogen storage system from dropping below a minimum allowable pressure, said method comprising:
    operating the hydrogen storage system to provide hydrogen gas to a fuel cell system via a single flow path;
    defining a pressure reading increment value, including dividing a range of the pressure sensor by a number of possible values of the pressure reading;
    monitoring pressure of the hydrogen gas at a pressure sensor which is located downstream of a pressure regulator in the single flow path;
    identifying a fluctuation range of preceding pressure readings from the pressure sensor, including calculating a rolling median pressure value for the preceding pressure readings from the pressure sensor;
    determining that a current pressure reading from the pressure sensor is lower than the fluctuation range of the preceding pressure readings; and closing vessel shut-off valves located downstream of each of the one or more pressure vessels, to prevent the pressure in the vessels from dropping below the minimum allowable pressure.

10. The method of claim 9 wherein determining that a current pressure reading from the pressure sensor is lower than the fluctuation range of the preceding pressure readings includes determining that the current pressure reading from the pressure sensor is lower than the rolling median pressure value by more than the pressure reading increment value.

11. The method of claim 9 wherein determining that a current pressure reading from the pressure sensor is lower than the fluctuation range of the preceding pressure readings includes determining that the current pressure reading from the pressure sensor is lower than a previous pressure reading from the pressure sensor by more than twice the pressure reading increment value.

12. A gas storage system with minimum pressure shut-off capability, said gas storage system providing a gas to a downstream device via a single flow path, said gas storage system comprising:
   one or more pressure vessels for storing the gas;
   a vessel shut-off valve located downstream of each of the one or more pressure vessels;
   a pressure regulator for reducing a pressure of the gas from the pressure vessels to a regulation pressure;
   a pressure sensor located downstream of the pressure regulator in the single flow path; and
   a controller in communication with the pressure sensor, the vessel shut-off valves, and the pressure regulator, said controller being programmed to receive signals from the pressure sensor and close the vessel shut-off valves in response to determining that the pressure regulator has reached a fully open position, to prevent the pressure of the gas in the pressure vessels from dropping below a minimum allowable pressure, where the controller is programmed to determine that the pressure regulator has reached a fully open position by calculating a pressure reading increment value as a range of the pressure sensor divided by a number of possible values of pressure readings, computing a rolling median pressure value for a preceding time window, and detecting a pressure reading from the pressure sensor which is lower than the rolling median pressure value by more than the pressure reading increment value.

13. The gas storage system of claim 12 wherein the controller is also programmed to determine that the pressure regulator has reached a fully open position by detecting a pressure reading from the pressure sensor which is lower than a previous pressure reading by more than twice the pressure reading increment value.

14. The gas storage system of claim 12 wherein the controller is programmed to include a delay time which begins when it is determined that the pressure regulator has reached a fully open position and ends when closing the vessel shut-off valves is commanded.

15. The gas storage system of claim 12 wherein the gas is hydrogen.

16. The gas storage system of claim 12 wherein the downstream device is a fuel cell system which is used to power a vehicle.

* * * * *